United States Patent [19]

Auchinleck

[11] 4,098,458
[45] Jul. 4, 1978

[54] ADJUSTABLE WIDTH DOCUMENT READER
[75] Inventor: Richard J. Auchinleck, Norristown, Pa.
[73] Assignee: Peripheral Dynamics, Inc., Norristown, Pa.
[21] Appl. No.: 736,063
[22] Filed: Oct. 27, 1976
[51] Int. Cl.² .................... G06K 13/20; B65H 9/16
[52] U.S. Cl. ............................... 235/475; 271/248
[58] Field of Search ............ 235/61.11 R, 61.11 A, 235/61.11 B, 61.11 C, 61.11 E, 61.11 D; 360/2; 250/569; 271/131, 138, 144, 248

[56] References Cited
U.S. PATENT DOCUMENTS

| | | | |
|---|---|---|---|
| 3,836,753 | 9/1974 | Pass | 235/61.11 R |
| 3,849,631 | 11/1974 | Merlino, Jr. et al. | 235/61.11 B |
| 3,883,723 | 5/1975 | Lukstas | 235/61.11 E |

*Primary Examiner*—Daryl W. Cook
*Attorney, Agent, or Firm*—Woodcock, Washburn, Kurtz & Mackiewicz

[57] ABSTRACT

A document reader, for reading paper cards and other types of discrete documents, having means for adjusting the reader to accommodate different width documents. The transport channel of the apparatus, through which the cards are passed during the reading process, is equipped with an adjustable wall for defining either discrete channel widths or a width range which can be set for operation with documents of any width within such range. In another embodiment, the document reader contains channel width adjusting elements in both the input and reading sections, and the channel width adjustment means of the reader section is adjustable in response to the position of the input width adjusting element.

17 Claims, 9 Drawing Figures

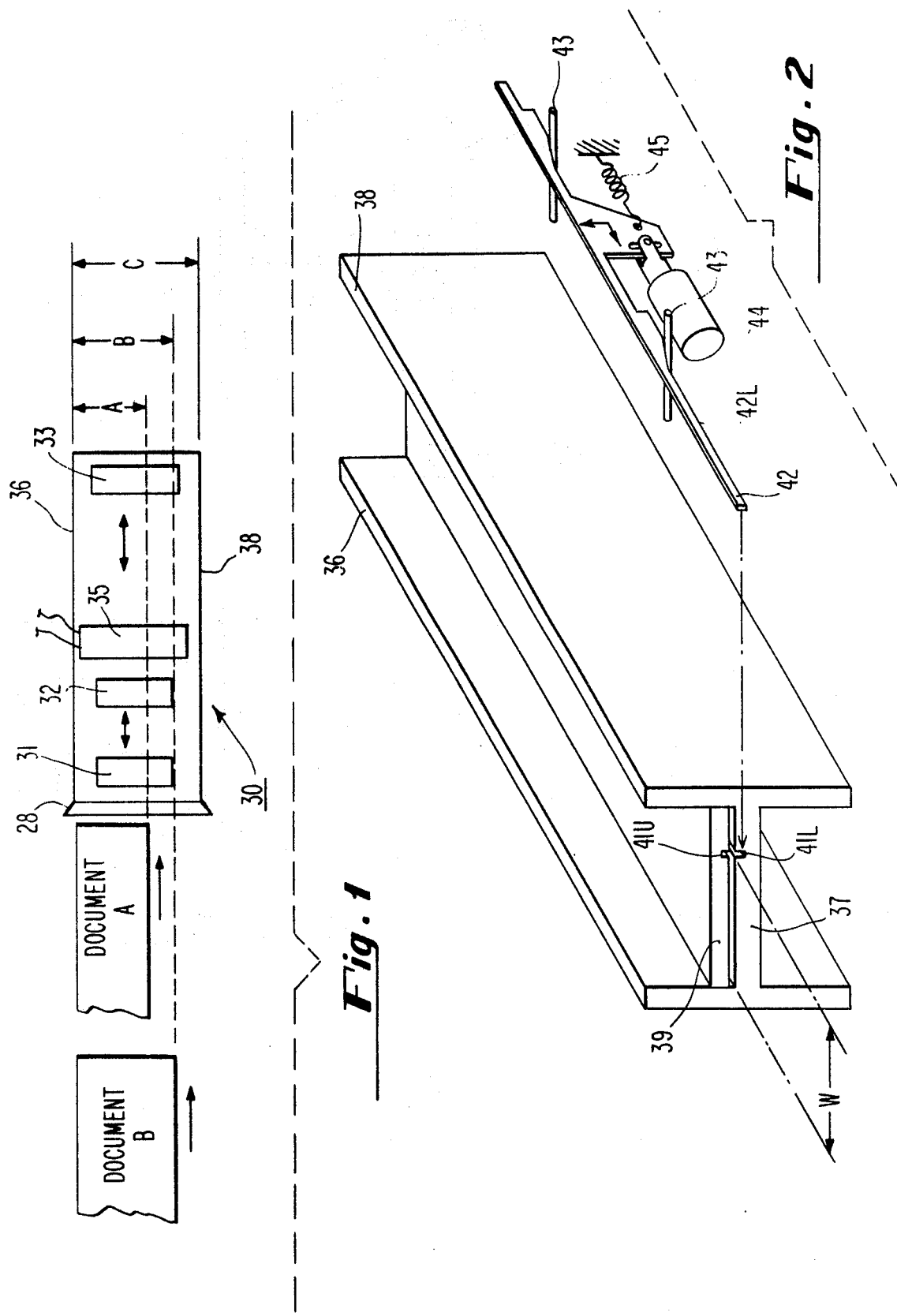

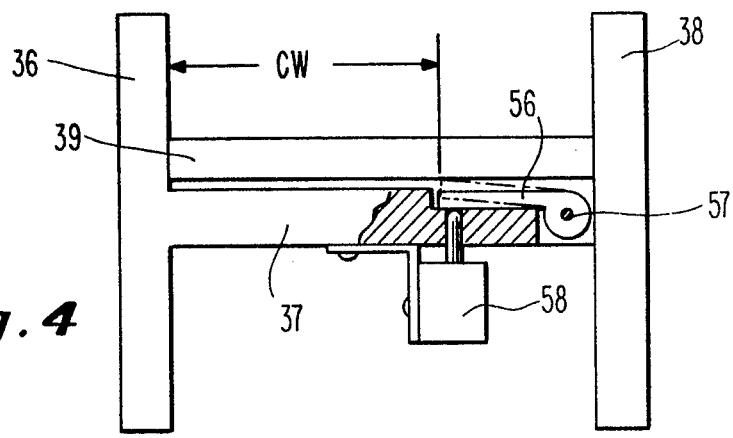
_Fig. 4_
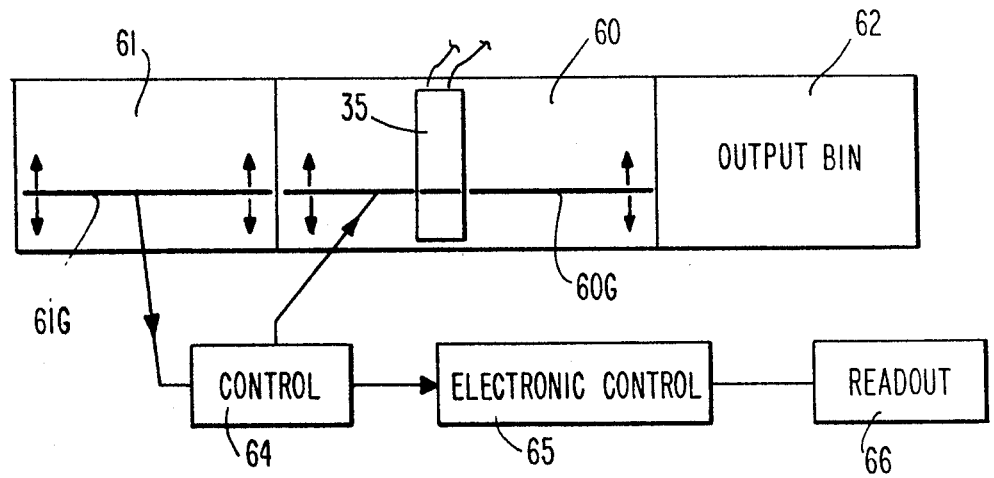
_Fig. 5_
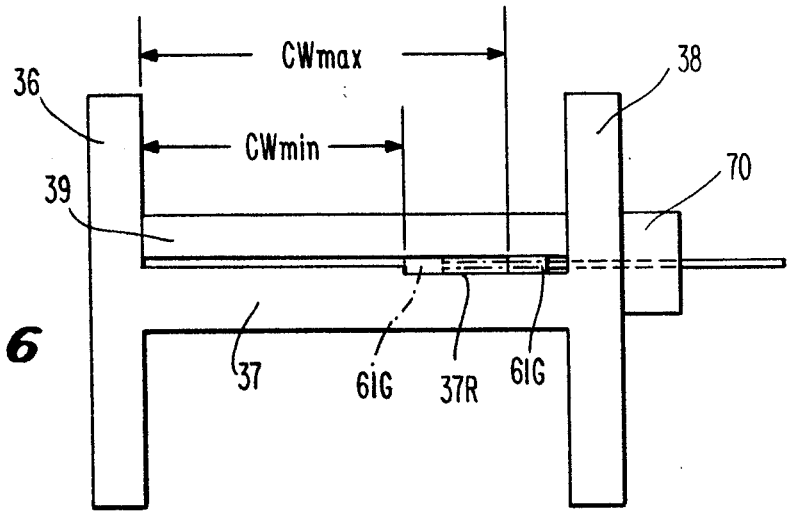
_Fig. 6_

ADJUSTABLE WIDTH DOCUMENT READER

BACKGROUND OF THE INVENTION

1. Field of the Invention

This invention relates to reader apparatus for the reading of documents containing encoded data, and in particular reader apparatus adaptable to read documents of any width within a predetermined range of widths.

2. Background of the Invention

In the field of document reading devices, there is a continuing need to optimize the flexibility of the apparatus design so as to accommodate different types of documents. It is to be noted that the large majority of document readers which have found commercial use to date have been card readers for reading the conventional size 80 column cards. For such readers, the mechanical design is fixed so as to optimally accommodate the single size of card, or document which is to be utilized. However, with the continuing spread of electronic data processing to more and more areas, there is a rising demand for document readers for reading all sorts of different types of documents such as cards, badges, etc., which come in a wide variety of sizes. While the capacity for reading documents of varying lengths has been provided commercially, there has heretofore not been an available document reader providing efficient and reliable means for accommodating documents of different widths.

SUMMARY OF THE INVENTION

It is the primary object of this invention to provide an improved document reading device having an arrangement enabling adjustment to accommodate documents of various widths.

It is a further object of this invention to provide an adjustable width document reader having manual or automatic means for setting the reader for the reading of documents of a given width.

In accordance with the above objectives, there is provided a document reader comprising a transport channel through which documents are transported while being read, and means for positioning the transported documents as a function of the width of said transported documents. In particular, means are provided for adjusting the effective width of the transport channel and/or the input means so as to guide the transport of the documents into and through the transport channel where they are maintained in a desired registry with the read section of the apparatus. In one embodiment, the apparatus includes input means having input positioning means for positioning the documents relative to the transport means, and the transport channel contains positioning means controllable from the input positioning means.

BRIEF DESCRIPTION OF THE DRAWINGS

FIG. 1 is a schematic representation illustrating the manner of adjusting the width of the channel of the document reader apparatus of this invention.

FIG. 2 is a perspective view showing an arrangement for changing the width of a card reader transport channel from a first width to a second narrower width.

FIG. 4 is an end diagrammatic view of another embodiment of the adjustable width document reader of this invention.

FIG. 5 is a schematic diagram illustrating a document reader having means for varying the effective width of the reader through a continuous range, with means indicated for controlling the width adjustment of the transport channel as a function of the width adjustment of the input hopper.

FIG. 6 is a schematic end view diagram of a document reader showing means for variable adjustment of the channel width through a range of widths.

DESCRIPTION OF THE PREFERRED EMBODIMENTS

Figure 3A:
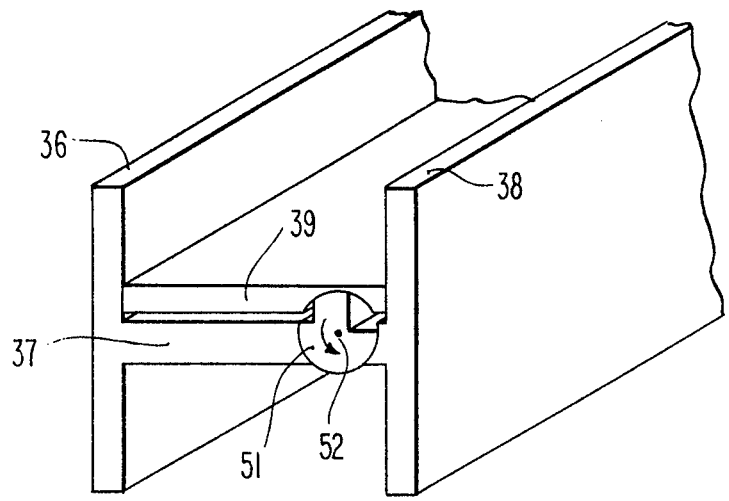
FIG. 3A is a partial perspective view showing an embodiment for establishing a plurality of discrete channel widths for the document reader apparatus of this invention.
Figure 3B:
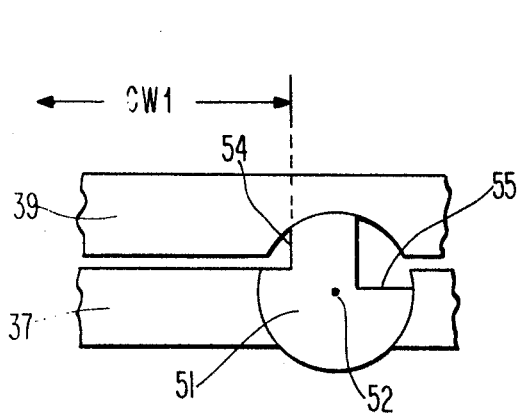
FIG. 3B and 3C are exploded views of a portion of the apparatus of FIG. 3A, showing different positions of the element which establishes the discrete channel widths.
Figure 3C:
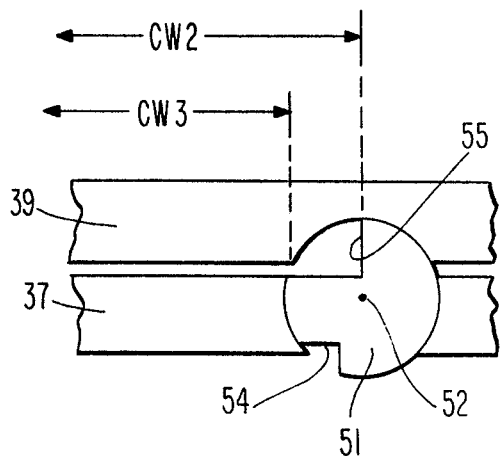

Referring to FIG. 1, there is presented a schematic diagram of a card reader incorporating the variable width feature of this invention, and illustrating the manner in which adjustment of the width is performed to accommodate varying width documents. The reader 30 is, for the illustration of FIG. 1, suitably a one-at-a-time reader, comprising an input port, or mouth 28 into which a document may be fed. In this illustration, the document is transported first into the reader 30 by rollers 31, 32 and, if necessary 33, and then cycled back out of the reader by reversal of the direction of the drive rollers. The drive rollers comprise a typical form of transport system for transporting the documents past a read station 35, which reads data from the documents as they are passed by it. Read station 35 may typically be a conventional scanning type of read station for use where the document data is not arranged in a predetermined format, or it may be a series of discrete sensors as are utilized conventionally for reading paper cards encoded with punched hole or mark sense data. The means for reading encoded data, including both the read station and associated electronics, are available commercially and accordingly are not described in detail in this specification. See also U.S. patent application Ser. No. 705,248, assigned to the same assignee, which is incorporated by reference.

In the illustration of FIG. 1, there is shown schematically, by the horizontal dashed lines, a guide which defines a width A corresponding to an inputted document A. Likewise, a second dashed line defines a width B, corresponding to an inputted document B as illustrated. It is to be noted that the widest channel provided by the reader 30 corresponds to the diagrammatic width of the reader, indicated as C, with the smaller widths being provided by positioning of a guide, or barrier, which, in combination with wall 36, defines the width of the reader channel.

Referring to FIG. 2, there is shown a first embodiment of a means for providing the positioning of such a guide wall to define a channel of width less than the maximum available channel width. Channel side walls 36 and 38 define the maximum channel width. The floor 37 provides the bottom surface on which the document is transported, and block 39 is positioned parallel to floor 37, block 39 and floor 37 defining the lower and upper limits of the channel through which the document is transported. Floor 37 has a groove 41L extending longitudinally therethrough, and block 39 has a groove 41U in registry with groove 41L. Groove 41L normally houses guide element 42, which may be actuated to rise up into groove 41U, in which upper position it blocks the channel opening between floor 37 and block 39, thereby defining a new channel width W. Element 42 has a cammed lower surface 42L such that when the element 42 is pulled by solenoid 44, it is caused to rise up onto fixed elements 43 into the blocking position. Spring 45 causes return of guide 42 to its downward position when solenoid 44 is deactivated. The means for activating solenoid 44, not shown, may be conventional means such as wiring terminating in a push button mounted on the reader frame, for operator actuation.

Figure 3D:
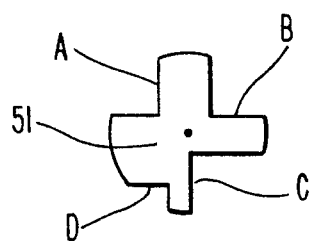
FIG. 3D is a diagrammatic view of an alternate element adaptable to be used in the embodiment of FIG. 3A, for establishing a plurality of discrete transport channel widths.

Referring now to FIGS. 3A-3D, there is illustrated another embodiment of the invention for providing a plurality of discrete channel widths. In this embodiment, a guide element 51 is housed in floor 37, and is pivoted about pivot point 52. Both floor 37 and top block 39 contain substantial semi-circular openings to permit rotation of the element 51 about its pivot 52. As can be seen by examination of FIGS. 3B and 3C, element 51 has a cross-sectional geometry which presents blocking surfaces 54 and 55 which may be positioned to provide respective different channel widths CW1 and CW2. Additionally, element 51 may be rotated to provide channel width CW3 as indicated. FIG. 3D shows element 51 alternate geometry presenting four blocking surfaces, A-D.

FIG. 4 is a schematic diagram of an end view of the channel of the card reader of this invention, illustrating another embodiment for providing alternate channel width CW. In this embodiment, a lever arm 56 is pivoted about a pivot point 57 mounted within floor 37, the pivoting being caused by solenoid actuator 58. Without actuation, lever 56 is seated within floor 37, such that the full channel width between sides 36 and 38 is available. Upon actuation of the solenoid means, lever 56 blocks the gap between floor 37 and block 39, creating the smaller width CW.

Referring now to FIG. 5, there is shown a schematic diagram illustrating the manner in which the width adjusting feature of this invention may be utilized in other types of readers. FIG. 5 illustrates a reader having a center section 60 comprising the transport section, an input section 61 which may be a conventional input hopper, or input bin, and an output section 62 which is a conventional output bin. Reference is made to U.S. Pat. No. 3,975,010, assigned to the same assignee, disclosing a card reader having this type of structure. In adapting the width adjusting feature of this invention to this type of reader, a guide element 61G is shown schematically in portion 61, as being movable to adjust the channel width for different size documents. Likewise, guide 60G is shown in transport section 60 as being adjustable, and in practice guides 61G and 60G are suitably controlled to be in registry such that documents fed from input bin 61 maintain a straight path through transport section 60 to output bin 62. Bin 62 may or may not need additional guide means to adjust for varying width documents. Guide element 61G, which may take the form of one of the embodiments above illustrated, is suitably mechanically ganged to element 60G, so as to provide the desired registry. Alternately, guide 61G may be independently positioned manually or by input means such as push button wiring leading to a solenoid arrangement. Element 60G may be servo controlled through conventional control means 64 to follow the positioning of element 61G. Likewise, control means 64 is utilized to develop a control signal which is connected to the electronic control portion 65 of the reader, where it in turn is utilized for controlling the readout operation. Thus, if guide element 61G is set for a given document width, a signal is generated corresponding to such setting, which signal is used to control the length of scan of read element 35. Alternately, the width information may be utilized, as in an RS232 interface unit, to read out data corresponding only to read stations which pick up data from a document of the width for which the reader is set. Reference is made to co-pending U.S. application Ser. No. 690,261, assigned to the same assignee, for a disclosure of an RS232 interface card reader system, which application is incorporated herein by reference.

Referring now to FIG. 6, there is shown a schematic diagram of an end view of an embodiment having a mechanism for lateral positioning of guide element 61G. In this arrangement, a motor 70 drives, as through a worm gear, guide element 61G, which moves through a recessed portion 37R of floor 37. Guide element 61G may be positioned to the far right to provide the maximum channel width designated $CW_{max}$, or to the far left corresponding to the minimum channel width $CW_{min}$. The advantage of this embodiment is that any channel width between the maximum and minimum may be provided. Likewise, the position of motor 70 provides a ready signal for connection to control element 64 and to electronic control 65. In the arrangement represented by FIG. 1, the adjustment means 70, 61G may be utilized within the channel 36-38, and a data control signal generated and utilized in a like manner.

In summary, a document reader apparatus is disclosed having the unique capability of being adjustable to accommodate different width documents. It is to be noted that in the embodiments shown, the position of the document as it is passed through or within the transport channel is adjusted relative to the transport means as a function of the width of the document. In other words, the transport means as embodied by rollers 31, 32, 33 is fixed, but the position of the document as it is transported is determined by the positioning of the adjusting means, so that such position is set relative to the transport means as a function of the width of the document.

I claim:
1. Document reader apparatus comprising:
   a. input means for inputting a document to said reader;
   b. read means, for reading information encoded on said document;
   c. transport means for transporting said document along a predetermined path relative to said read means so that said encoded information can be read, said transport means having a channel extending along said path and defining the width of said path; and
   d. means for adjusting said width to correspond to the inputted document, said adjusting means being adapted to adjust and maintain said path width to one of a plurality of selectable fixed predetermined widths.

2. The reader apparatus as described in claim 1, wherein said adjusting means cooperates with said transport means for positioning said document as it is transported by said transport means.

3. The reader apparatus as described in claim 2, wherein said input means comprises input positioning means for positioning said document relative to said transport means as it is being inputted to said reader.

4. The reader apparatus as described in claim 3, wherein said adjusting means is connected to said input positioning means and is controlled therefrom.

5. The reader apparatus as described in claim 4, wherein said input positioning means comprises control signal generating means for generating a control signal representative of the width of said document, and said adjusting means is controlled by said control signal.

6. The reader apparatus as described in claim 5, wherein said read means is controlled by said control signal.

7. The reader apparatus as described in claim 1, wherein said adjusting means comprises means for guiding said document as it is transported by said transport means.

8. The reader apparatus as described in claim 1, wherein said input means comprises means for controlling the operation of said read means as a function of the width of said document.

9. The reader apparatus as described in claim 1, wherein said input means comprises means for controlling said adjusting means as a function of the width of said document.

10. The reader apparatus as described in claim 1, wherein said input means comprises means for positioning said document relative to said transport means, said positioning means providing a respective input channel corresponding to each of said fixed transport channel widths.

11. The apparatus as described in claim 1, wherein said channel comprises a channel floor on which the document is transported, and said adjusting means comprises a guide element normally recessed within said floor adjustable to be positioned so as to define said width.

12. Document reader apparatus adaptable for reading various width documents, comprising:
   a. transport means for transporting a document within said reader apparatus;
   b. read means for reading information encoded on said document as it is transported by said transport means;
   c. a channel defining a path along which said document is transported within said reader apparatus by said transport means, and comprising width adjustment means for adjusting the width of said channel to one of a predetermined plurality of respective fixed widths, so as to accommodate documents of different widths; and
   d. input means for inputting said document to said reader apparatus, said input means having a plurality of predetermined input positions corresponding to said plurality of predetermined fixed widths, each of said input positions being in operative registry with one of said fixed widths.

13. Document reader apparatus adaptable for reading various width documents, comprising:
   a. transport means for transporting a document within said reader apparatus;
   b. read means for reading information encoded on said document as it is transported by said transport means;
   c. a channel defining a path along which said document is transported within said reader apparatus by said transport means, and comprising width adjustment means for adjusting the width of said channel, so as to accommodate documents of different widths; and
   d. control means for controlling the operation of said read means as a function of the adjustment of said width adjustment means, whereby said read means operates to read encoded data corresponding to the width of said transported document.

14. Document reader apparatus adaptable for reading various width documents, comprising:
   a. transport means for transporting a document within said reader apparatus;
   b. read means for reading information encoded on said document as it is transported by said transport means;
   c. a channel defining a path along which said document is transported within said reader apparatus by said transport means, and comprising width adjustment means for adjusting the width of said channel, so as to accommodate documents of different widths; and
   d. readout means for reading data out of said apparatus, and control means for controlling the operation of said readout means as a function of the adjustment of said width adjustment means.

15. Document reader apparatus comprising:
   a. input means for inputting a document to said reader;
   b. read means, for reading information encoded on said document;
   c. transport means for transporting said document relative to said read means so that said encoded information can be read;
   d. means for adjusting the position of said document relative to said transport means as a function of the width of said document, said adjusting means cooperating with said transport means for positioning said document as it is transported by said transport means;
   e. said input means comprising input positioning means for positioning said document relative to said transport means at it is being inputted to said reader, said adjusting means being connected to said input positioning means and controlled therefrom; and
   f. said input positioning means further comprising control signal generating means for generating a control signal representative of the width of said document, and said adjusting means is controlled by said control signal.

16. The reader apparatus as described in claim 15, wherein said read means is controlled by said control signal.

17. Document processing apparatus comprising:
   a. input means for inputting a document to said apparatus;
   b. transport means for transporting said document along a predetermined path within said apparatus, said transport means having a channel extending along said path with a channel floor on which the document is transported;
   c. processing means for processing said document as it is transported by said transport means; and
   d. channel width means for setting the channel width to correspond to the width of the inputted document, said channel width means comprising a guide element adjustable in height with respect to said channel floor to define said width.

* * * * *